United States Patent [19]
Dart et al.

[11] 3,825,378
[45] July 23, 1974

[54] MOLD APPARATUS

[75] Inventors: William A. Dart, Mason; James R. Davis, Okemos, both of Mich.

[73] Assignee: Dart Container Corporation, Mason, Mich.

[22] Filed: Apr. 13, 1973

[21] Appl. No.: 350,689

[52] U.S. Cl. ............... 425/4 R, 264/51, 264/335, 425/245, 425/437, 425/817
[51] Int. Cl. .............................. B29d 27/00
[58] Field of Search ....... 425/4, 817, 245, 437, DIG. 425/812; 264/51, 53, DIG. 10, 334, 335; 137/525; 251/DIG. 1; 249/141; 164/310

[56] References Cited
UNITED STATES PATENTS

| | | | |
|---|---|---|---|
| 3,079,630 | 3/1963 | Orr | 425/817 X |
| 3,225,126 | 12/1965 | Bridges et al. | 264/51 |
| 3,261,055 | 7/1966 | Dart | 425/817 X |
| 3,729,021 | 4/1973 | Humphrey | 251/DIG. 1 |

Primary Examiner—R. Spencer Annear
Assistant Examiner—Mark Rosenbaum
Attorney, Agent, or Firm—Miller, Morriss, Pappas & McLeod

[57] ABSTRACT

A mold apparatus having a core element provided with a plurality of spaced apart steam and air emitting ports which open into the mold cavity and which are circumferentially positioned within an annular groove provided in the upper portion of the core element. An elastic ring element positioned in the annular groove so as to normally cover the steam and air emitting ports. The elastic ring element being expandable to permit air or steam under pressure to flow from the ports into the mold cavity but normally closing against the ports to prevent the contents of the mold cavity from entering and clogging the steam and air emitting ports and the channels within the core element which lead thereto.

6 Claims, 9 Drawing Figures

3,825,378
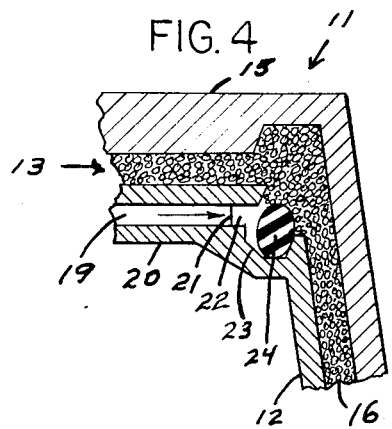
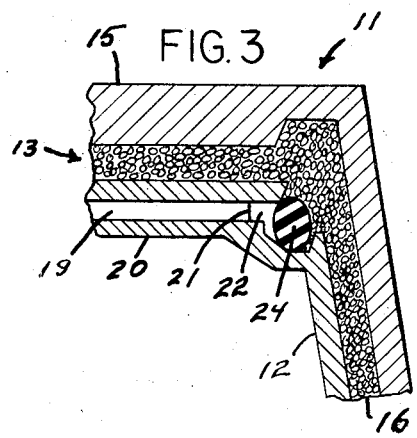
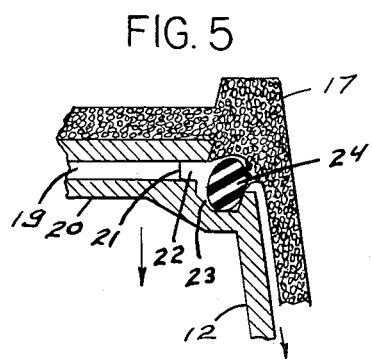
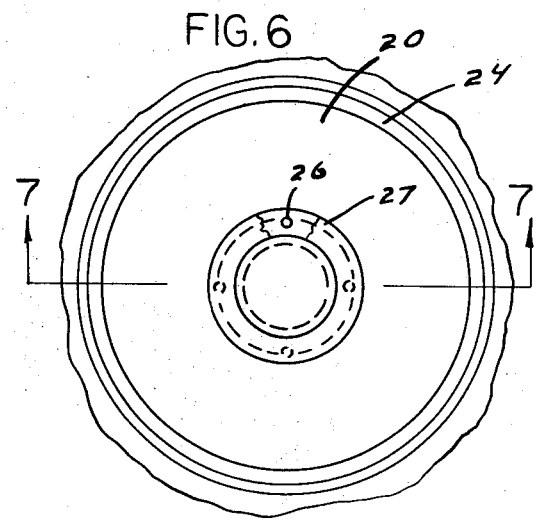
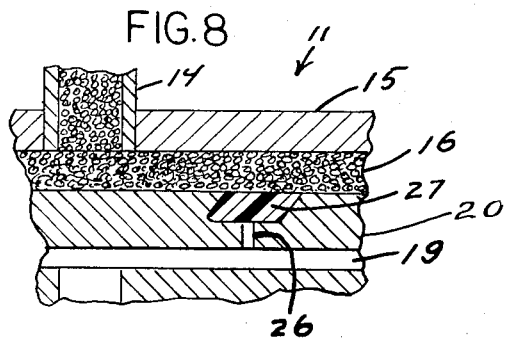
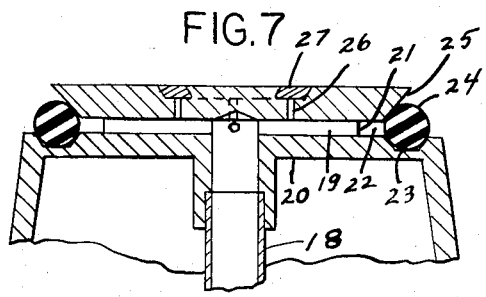
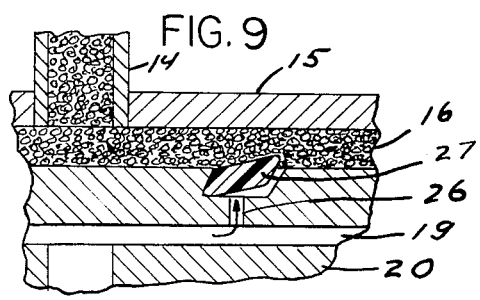

MOLD APPARATUS

SUMMARY OF THE INVENTION

This invention relates to an improved mold apparatus for forming plastic articles from expandable resin beads wherein the mold core element is provided with a plurality of steam and air emitting inlet ports which open into the mold cavity and which are circumferentially positioned within an annular groove provided in the upper portion of the core element. An elastic ring element is positioned in the annular groove so as to normally cover the steam and air emitting ports but which is expandable to permit air or steam under pressure to flow from the inlet ports into the mold cavity. The ring element normally covers the ports so as to prevent the contents of the mold cavity from entering and clogging the ports and the channels or bores within core element which lead thereto.

This invention is an improvement to the Apparatus For Forming Plastic Articles, U.S. Pat. No. 3,261,055, dated July 19, 1966 and Method For Forming Foamed Plastic Article, U.S. Pat. No. 3,355,530, dated Nov. 28, 1967 which were previously invented and patented by the applicant. While this invention also relates to a mold apparatus which is provided with a single channel system which is alternately utilized to conduct steam into the mold cavity for foamably expanding resin beads contained therein and to conduct air into the same mold cavity so as to effect ejection of the finished container after the molding operation has been completed, it is not necessarily limited to such a combination system. This invention can be used with solely a steam emitting port and channel system or solely with a pressured ejection air port and channel system.

PRIOR ART

The forming of thin wall cellular plastic containers is well known in the prior art. Representative of such prior art are the applicant's U.S. Pat. Nos. 3,178,491, 3,378,885, 3,261,055 and 3,355,530 and the patent references cited therein.

The mold apparatus shown and described in U.S. Pat. Nos. 3,178,491 and 3,378,885 is provided with mold elements which are selectively heated and cooled to effect the formation of the containers, but does not have any channel system whereby steam or air is introduced directly into the mold cavity itself. Thus, there are no steam or air emitting ports which would become clogged by the resin material introduced into and being expanded within the mold cavity.

The present invention is an improvement to the mold apparatus shown and described in U.S. Pat. Nos. 3,261,055 and 3,355,530 wherein a single transverse channel bore is provided in the upper wall of the core member so as to selectively convey steam or air from the central tubular channel member to the external annular groove which is provided around the upper portion of the core element and is in open communication with the mold cavity. The apparatus of U.S. Pat. Nos. 3,261,055 and 3,355,530 encountered problems in operation because the transverse channel bore became plugged with resin particles during the loading operation and more particularly, during the foaming operation whereby the resin beads contained in the mold cavity are heated and expanded by steam emitting from the inlet ports so as to form the container.

In the present invention, a plurality of radially extending transverse channel bores are provided in the upper wall of the mold core element so as to provide a plurality of ports in the annular groove in order to selectively provide a more evenly distributed amount of steam and air into the mold cavity.

An elastic O-ring element is positioned in the annular groove so as to normally cover the inlet ports. Thus, the air and steam inlet ports are covered when the resin beads are being loaded into the mold cavity. This prevents fine resin particles or small beads from entering and clogging the inlet ports and channel bores leading thereto.

When pressurized air or steam is selectively fed through channel bores, the elastic O-ring element expands outwardly in response thereto so as to allow the steam or air to pass into the mold cavity.

Steam is introduced into the mold cavity to foamably expand the resin beads contained therein. When the steam is shut off, the O-ring element contracts to its original position so as to close off the inlet ports. In fact, the pressure within the mold cavity forces the ring element back to close the inlet ports even before the steam is shut off. Thereby the expanding resin is prevented from passing into the inlet openings and thus all clogging is eliminated. Further, the pressure of the expanding resin acts against the outer surface of the O-ring element so as to more positively effect closure of the transverse bore openings or ports.

When the container has been formed, the mold elements separate and pressurized air is introduced through the channel bores causing the O-ring element to expand so as to allow the pressurized air to enter the mold cavity. The pressurized air acts against the container causing it to eject from the mold core element. When the pressurized air is shut off, the O-ring element returns to its normal rest position against the inlet ports thereby closing them. The mold apparatus is then ready for the loading stage.

It is therefore an object of this invention to provide a mold apparatus having a ring element valve means so as to prevent the clogging of air or steam inlet ports and channels by resin materials contained in the mold cavity.

Another object of this invention is to provide a mold apparatus having ring element means so as to selectively permit the introduction of air or steam into the mold cavity while preventing the clogging of the inlet ports and channels by resin materials when the air or steam is shut off.

Yet another object of this invention is to provide a mold apparatus wherein the air and steam inlet ports are provided in association with ring element check valve means which selectively permit the introduction of air or steam into the mold cavity and prevent the clogging of the inlet ports and channels by resin particles contained in the mold cavity.

A still further object of this invention is to provide a mold apparatus wherein ring element closure means selectively seal the mold cavity air and steam inlet ports during the mold cavity resin loading and mold cavity resin expansion stages so as to prevent clogging of the air and steam inlet ports by fine resin particles and expanding resin foam, respectively.

Other objects and advantages found in the construction of my invention will be apparent from a consideration of the following specification in connection with the appended claims and the accompanying drawings.

IN THE DRAWINGS

FIG. 3 is a partial cross-sectional schematic view of the mold apparatus showing the ring valve element in its normal rest position covering the air and steam inlet ports so as to prevent the resin particles in the mold cavity from entering and clogging the air and steam inlet ports and channels.

FIG. 4 is a partial cross-section schematic view of the mold apparatus showing the ring valve element pushed away from the air and steam inlet ports under the pressure of steam entering the mold cavity from the inlet ports.

FIG. 5 is a partial cross-section schematic view of the mold apparatus showing the ring valve element pushed away from the air and steam inlet ports under the pressure of the air used to eject the molded cup from the male mold core element.

FIG. 6 is a top schematic view of another embodiment of the invention showing an additional ring element and air and steam inlet ports in the top face of the male mold core element.

FIG. 7 is a partial schematic cross-sectional view taken on the line 7—7 of FIG. 6 showing the ring elements respectively positioned on the corner of the male mold element and on the top face thereof.

FIG. 8 is a partial schematic cross-sectional view of the central top portion of the mold apparatus showing the ring element in the top surface of the mold core element in its closed position covering the air and steam inlet port while the resin particles are being loaded into the mold cavity.

FIG. 9 is a partial schematic cross-sectional view of the central top portion of the mold apparatus showing the ring element pushed away from the air and steam inlet port under pressure of the steam entering the mold cavity from the inlet port.

GENERAL DESCRIPTION

Figure 1:
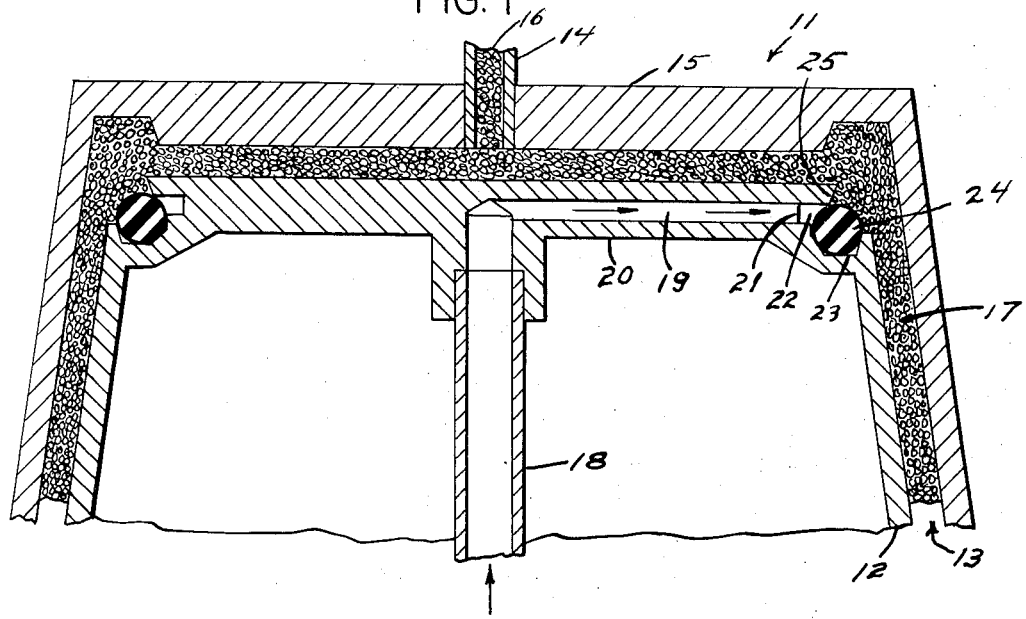
FIG. 1 is a cross-sectional schematic view of the mold apparatus showing the upper portion of the mold cavity and the air and steam channel and inlet ports, the ring element and the resin inlet channel.

In general, the instant invention is an improvement to the overall mold apparatus as shown and described in U.S. Pat. Nos. 3,261,055 and 3,355,530 and which are incorporated herein by reference. While the present embodiment of this invention is utilized with a mold apparatus specifically designed for forming thin wall containers, the invention has application and use in all types of mold structures for forming any type of product from expandable resin beads.

Heretofore, a serious maintenance and operational problem has existed in the operation of the earlier mold apparatus due to the clogging of the air and steam inlet channels and ports. This clogging occurred due to the fact that fine resin particles and small size beads entered the inlet ports and channels during the loading operation when the resin particles were being introduced into the mold cavity. Further clogging occurred when the resin beads were foamably expanded by introduction of steam into the mold cavity. The resin beads would expand into the inlet ports and channels and create clogging which would seriously impair the overall operation of the mold apparatus.

The instant invention provides elastic ring elements which normally cover and close the air and steam inlet ports during the resin loading stage and during the resin foam expansion stage when the cup is actually formed. The ring elements are sufficiently resilient so that they are pushed away from the air and steam inlet ports under pressure of steam being introduced therethrough into the mold cavity so as to foamably expand the resin or when pressurized air is introduced therethrough so as to eject the completed cup from the male mold element. The overall operation of the mold apparatus is shown and described in U.S. Pat. Nos. 3,261,055 and 3,355,530 and will not be repeated but is incorporated herein by reference. However, as previously stated, this invention is not necessarily limited to such a mold apparatus, but can be used in connection with any type of mold apparatus where clogging of this type occurs.

It should be pointed out that single or multiple air and steam channel systems and inlet ports can be utilized at positions in the mold apparatus other than as shown in the drawings without departing from the scope of the invention. There can be multiple ring elements provided on the top surface and along the side surface of the mold elements forming the mold cavity.

The cross-sectional configuration of the ring element can be varied from the O shape as desired so as to conform to the shape of the groove in which it fits and according to the dictates of its operative use position on the mold element.

The use of the ring element as a check valve to prevent resin particles from entering the air and steam inlet ports and channels is additionally critical when smaller resin bead sizes must be utilized in the formation of cups with thinner wall size requirements. In such applications, the clogging problem is even more critical.

While the present embodiment of the invention utilizes a single channel system to selectively introduce pressurized air to eject completed cups and steam to cause expansion or foaming of the resin, it is within the scope of the present invention to provide separate channels and inlet ports for air ejection and steaming purposes, respectively. Each system would have its own check valve ring elements. Further, a steam channel system and inlet ports can be used with the ring element while relying solely on mechanical means to effect ejection of the completed cups.

SPECIFIC DESCRIPTION

As shown in FIG. 1, a female mold assembly 11 is provided which receives a mold core element 12 so as to form a mold cavity 13. A material inlet tube element 14 is provided through the upper wall 15 of the female mold assembly 11 so as to be in open communication with the mold cavity 13. Pre-expanded polystyrene beads 16 can be selectively introduced into the mold cavity 13 so as to form a thin wall container 17.

The associated material feed assembly and mold apparatus structure and method are not shown, but are of the same general structure as that shown and described in the previously issued U.S. Pat. Nos. 3,178,491, 3,261,055 and 3,355,530 which are incorporated herein by reference.

Figure 2:
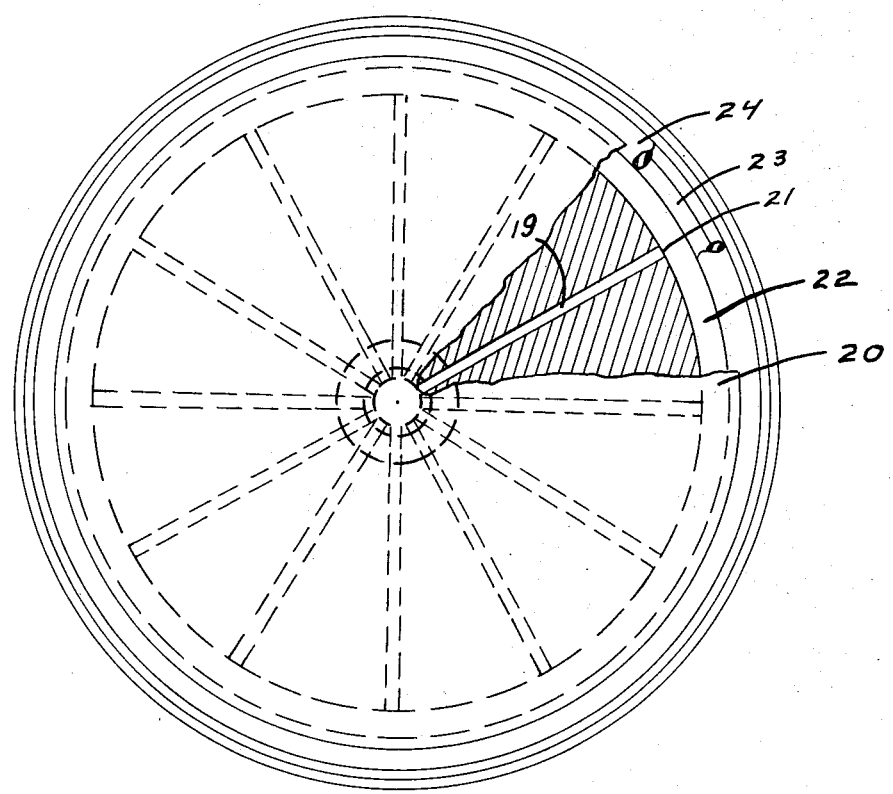
FIG. 2 is a top schematic view of the mold core element showing the radially extending channel bores on the top wall thereof and with a portion broken away to show the ring element in its operative use position.

An axially positioned vertically oriented tubular channel member 18 is provided in the core element 12 and extends upwardly therethrough to contact the upper portion thereof. As shown in FIGS. 1, 2 and 7, one or more radially extending horizontally oriented channel bores 19 are provided through the upper wall 20 of the core element 12. The channel bores 19 are in open communication with the tubular channel member 18 and extend outwardly to terminate as inlet ports 21 which communicate with an external annular channel 22 provided around the upper portion of the core element 12. Thus formed, the external channel 22 is in open communication with the mold cavity 13.

It is within the scope of the invention to provide annular grooves at the corners or along the wall surfaces of the mold elements which face the mold cavity. Air and steam inlet ports are circumferential positioned within such annular grooves so that steam and air can selectively be introduced directly through the wall of the mold element directly into the mold cavity. Elastic ring elements snap positioned in such groove would act as check valve elements as described herein.

A ring element annular seating groove 23 is provided in the corner portion of the core element 12 adjacent the external channel 22. An elastic ring element 24 is provided within the seating groove 23 so as to normally abut against the inner wall of the seating groove 23, the channel 22 and the upper end surface 25 of the upper wall 20 of the mold element 12. In this position ring elements 24 seals the channel 22 and prevents resin particles or beads 26 and expanding resin foam contained in the mold cavity from entering and clogging the inlet ports 21 and channel bores 19. If desired, the inlet ports 21 can be positioned directly in the surface of the annular groove so that the ring element 24 bears directly thereagainst as shown in FIGS. 8 and 9.

The ring element 24 is fabricated from Teflon and can also be made from other elastic plastic or rubber material which has been compounded to withstand steam and heat. While the ring element as shown in FIGS. 1 and 2 has been shown to have an "O" or round cross-sectional configuration it can be designed to have any desired cross-sectional configuration so as to adapt to any particular design application as shown in the other figures.

As shown in FIGS. 1 and 3, the ring element 24 seals the annular channel 22 while the resin beads 16 are loaded into the mold cavity 13. After the mold cavity 13 has been filled with resin beads and the loading sequence has been completed, steam is introduced into the mold cavity through the channel bores 19 into annular channel 22. The pressure of the steam causes the ring element 24 to move outwardly, thus permitting the steam to enter the mold cavity causing the resin beads to foamably expand so as to form the thin wall container 17.

When the steam is stopped, the ring element 24 moves back to its normal position so as to seal the annular channel 22 from the mold cavity 13. This is the same position as shown in FIG. 3. The pressure of the expanding resin foam acts against the ring element so as to effect a more positive closure sealing action. In fact, the pressure from the foaming action forces the ring element back against the inlet ports so that closure thereof is effected before the steam is actually shut off.

When the foaming sequence has been completed, the male mold core element 12 is withdrawn and the completed container 17 is ejected therefrom by use of air pressure acting through the bores 19 as shown in FIG. 5. The ring element 24 moves outwardly under the pressure of the air so as to permit the ejection air to act against the inside surface of the container, thereby ejecting it from the mold core element 12. After the container 17 has been ejected and the ejection air is stopped, the ring element 24 returns to its normal rest closed position ready for the loading sequence. Once again, the resin beads are introduced into the mold cavity by use of air pressure which also acts against the ring element 24 to effect a more positive sealing action.

The invention could be utilized in a mold apparatus of any general configuration having a first mold element and a second mold element in association therewith so as to form a mold cavity. One or more annular grooves can be provided in the surface of at least one of the mold elements. One or more air and/or steam inlet ports are positioned within the grooves so as to open directly into the mold cavity when exposed. An elastic ring element is snap mounted in said groove so as to normally close against the inlet port or ports thereby preventing material within the mold cavity from entering and clogging the ports. The elastic ring element is adapted to expand in response to steam or air pressure emitting from the inlet ports so as to permit the steam or air to enter the mold cavity in the manner and for the purposes described herein.

It is thus seen that the ring element 24 acts as a check valve during the loading and foaming stages which effectively prevents clogging of the air and steam inlet ports and channel systems.

It is within the scope of the invention to utilize a plurality of air and steam inlet systems and a plurality of ring elements in operative use therewith. A dual system is shown in FIGS. 6 and 7 where channel inlet ports 26 and ring element 27 are provided in the upper surface 20 of the core element 12. The ring element 27 acts in concert with ring element 24 under the effect of the ejection air pressure and steam, respectively as previously described. The position of the ring element 27 during the loading and forming stages is shown in FIG. 8. The position of the ring element 27 during the steam and ejection air introduction stages, respectively, is shown in FIG. 9.

It is also within the scope of the invention to utilize additional inlet ports and ring element systems as desired. Thus, plural rings can be used on the upper surface and on the side of the mold core element. In addition, inlet ports and ring element systems can be provided in the wall of the female mold element 11 which forms the mold cavity.

In addition, a prefabricated plug element can be provided which defines a channel inlet port system and has an associated ring element similar to inlet ports 27 and ring element 27. The wall of a standard mold core element can be bored so as to receive such a plug element. Thus, the channel inlet ports thereof would be in open communication with the interior of the mold element so that steam or air introduced therein would pass past the ring element 27 into the mold cavity as described herein.

Further, it is within the scope of the invention to provide the surfaces of mold elements with "closed circuit" or endless grooves and matching "ring" elements snap mounted therein so as to close against inlet ports positioned within the grooved surface. Such configurations could be oval, triangular, rectangular and would operate identically as the circular "ring" configuration shown in the drawings.

Although a specific mold apparatus having a specific design has been described herein, it is within the scope of this invention to vary the design for specific applications as long as the ring element check valve invention described herein is utilized to result in a mold apparatus which does not clog up due to introduction of resin particles and expanding resin foam into the air and steam inlet ports and channel bore systems.

Various modifications of the invention may be made without departing from the principle thereof. Each of these modifications is to be considered as included in the hereinafter appended claims unless these claims by their language expressly provide otherwise. Having thus set forth the nature of our invention, we claim the following:

We claim:

1. In a mold apparatus, the combination including:
   a first mold element;
   a second mold element in association with said first mold element so as to define a mold cavity therewith;
   an annular groove provided in the surface of at least one of said mold elements so as to open into said mold cavity, said annular groove provided with at least one inlet port in the surface thereof; and
   an elastic ring element is snap mounted in said groove so as to normally close against said inlet port, said elastic ring element adapted to expand away from said inlet port in response to steam or air pressure emitting therefrom.

2. In the mold apparatus of claim 1 wherein a plurality of inlet ports are circumferentially positioned within said annular groove.

3. In the mold apparatus of claim 1 wherein a plurality of annular grooves having inlet ports positioned therein are provided on one or more of said mold elements, each of said annular grooves provided with an elastic mating ring element snap-mounted therein.

4. In a mold apparatus, the combination including:
   a female mold element;
   a mold core element provided in association with said female mold element so as to define a mold cavity therewith, said mold core element defining a plurality of annularly positioned air and steam inlet ports on the outer surface thereof; and
   an elastic ring element provided on said core mold element in substantial covering register with said inlet ports, said ring element adapted to normally close against said inlet ports, said ring element adapted to expand away from said inlet ports in response to steam or air pressure emitting therefrom.

5. In a mold apparatus having resin loading, resin foaming and completed container air ejection stages, the combination including:
   a female mold element having resin material inlet means provided in association therewith;
   a core element provided in association with said female mold element so as to define a mold cavity therewith, said core element defining at least one steam and air supply channel and inlet port therein so as to selectively introduce steam and air into the mold cavity;
   an elastic ring element provided on the said core element in register with said steam and air inlet port, said ring element selectively adapted to selectively effect closure of said inlet port during the resin loading and resin foaming stages, said ring element adapted to move away from said inlet port under pressure of ejection air and steam in said steam and air supply channel so as to permit the selective introduction of steam and ejection air into the mold cavity.

6. In a plug element for insertion into the wall of a mold apparatus, the combination including:
   a plug element defining an endless groove in the wall-cavity facing surface thereof, said plug element further defining a channel inlet port therethrough within said groove; and
   a mating ring element snap-mounted in said groove so as to cover said inlet port, said ring element adapted to expand so as to open said inlet port in response to steam or pressurized air emitting therefrom.

* * * * *